US012726851B2

(12) United States Patent
Xu et al.

(10) Patent No.: US 12,726,851 B2
(45) Date of Patent: Sep. 1, 2026

(54) METHOD, DEVICE, AND SYSTEM FOR INDICATING A BUFFER STATUS REPORT WITH AN INDEX TO A DATA SIZE TABLE

(71) Applicant: ZTE Corporation, Shenzhen (CN)

(72) Inventors: Jiajun Xu, Shenzhen (CN); Yuzhou Hu, Shenzhen (CN); Xiaoying Ma, Shenzhen (CN); Jun Xu, Shenzhen (CN); Mengzhu Chen, Shenzhen (CN); Hong Tang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 344 days.

(21) Appl. No.: 18/431,466

(22) Filed: Feb. 2, 2024

(65) Prior Publication Data

US 2024/0259867 A1 Aug. 1, 2024

Related U.S. Application Data

(63) Continuation of application No. PCT/CN2021/111146, filed on Aug. 6, 2021.

(51) Int. Cl.
*H04W 28/02* (2009.01)

(52) U.S. Cl.
CPC .............................. *H04W 28/0278* (2013.01)

(58) Field of Classification Search
CPC .... H04W 28/0278; H04W 72/21; H04W 8/22
See application file for complete search history.

(56) References Cited

U.S. PATENT DOCUMENTS

2011/0171967 A1* 7/2011 Lee ...................... H04W 72/52 455/452.1
2011/0310800 A1* 12/2011 Lin .................. H04W 28/0278 370/328

(Continued)

FOREIGN PATENT DOCUMENTS

CN 102083206 A 6/2011
CN 102364975 A 2/2012

(Continued)

OTHER PUBLICATIONS

Office Action issued in Chines Patent Application No. 202180101368.5 dated Apr. 3, 2025, w/English translation, 10 pages.

(Continued)

*Primary Examiner* — Afshawn M Towfighi
(74) *Attorney, Agent, or Firm* — Crowell & Moring LLP

(57) ABSTRACT

This disclosure above describes a method, a device, and a system for transmitting and receiving resource request indications. Performed by a wireless terminal in a wireless network, the method includes transmitting, to a wireless communication node in the wireless network, indication information indicating a requested data size for transmitting UL traffic to the wireless communication node, wherein the requested data size is not in a base data size table. Another method, performed by a wireless communication node, includes receiving, from a wireless terminal, indication information indicating a requested data size for transmitting UL traffic to the wireless communication node, wherein the requested data size is not in a base data size table.

15 Claims, 3 Drawing Sheets

(56) References Cited

U.S. PATENT DOCUMENTS

2013/0100908 A1* 4/2013 Xu ........................ H04W 28/12
370/328
2014/0078965 A1* 3/2014 Wu ......................... H04L 67/06
370/328
2021/0176661 A1* 6/2021 Kim .................. H04W 28/0278

FOREIGN PATENT DOCUMENTS

| | | | | |
|---|---|---|---|---|
| CN | 102547669 A | | 7/2012 | |
| CN | 103402267 A | | 11/2013 | |
| CN | 106470445 A | | 3/2017 | |
| CN | 107872885 A | | 4/2018 | |
| EP | 2584714 B1 | * | 5/2019 | ........ H04W 28/0278 |

OTHER PUBLICATIONS

Office Action issued in Chinese Patent Application No. 202180101368.5 dated Dec. 24, 2024, w/English translation, 12 pages.
Chinese-language Office Action issued in Chinese Application No. 2021801013685 dated Sep. 30, 2024 with English translation (17 pages).
International Search Report in International Application No. PCT/CN2021/111146 dated Apr. 25, 2022, 3 pages.
Asustek, "BSR Trigger for New BSR Table", *3GPP TSG-RAN W62 Meeting #71bis R2-105426*, Oct. 15, 2010, 2 pages.

* cited by examiner

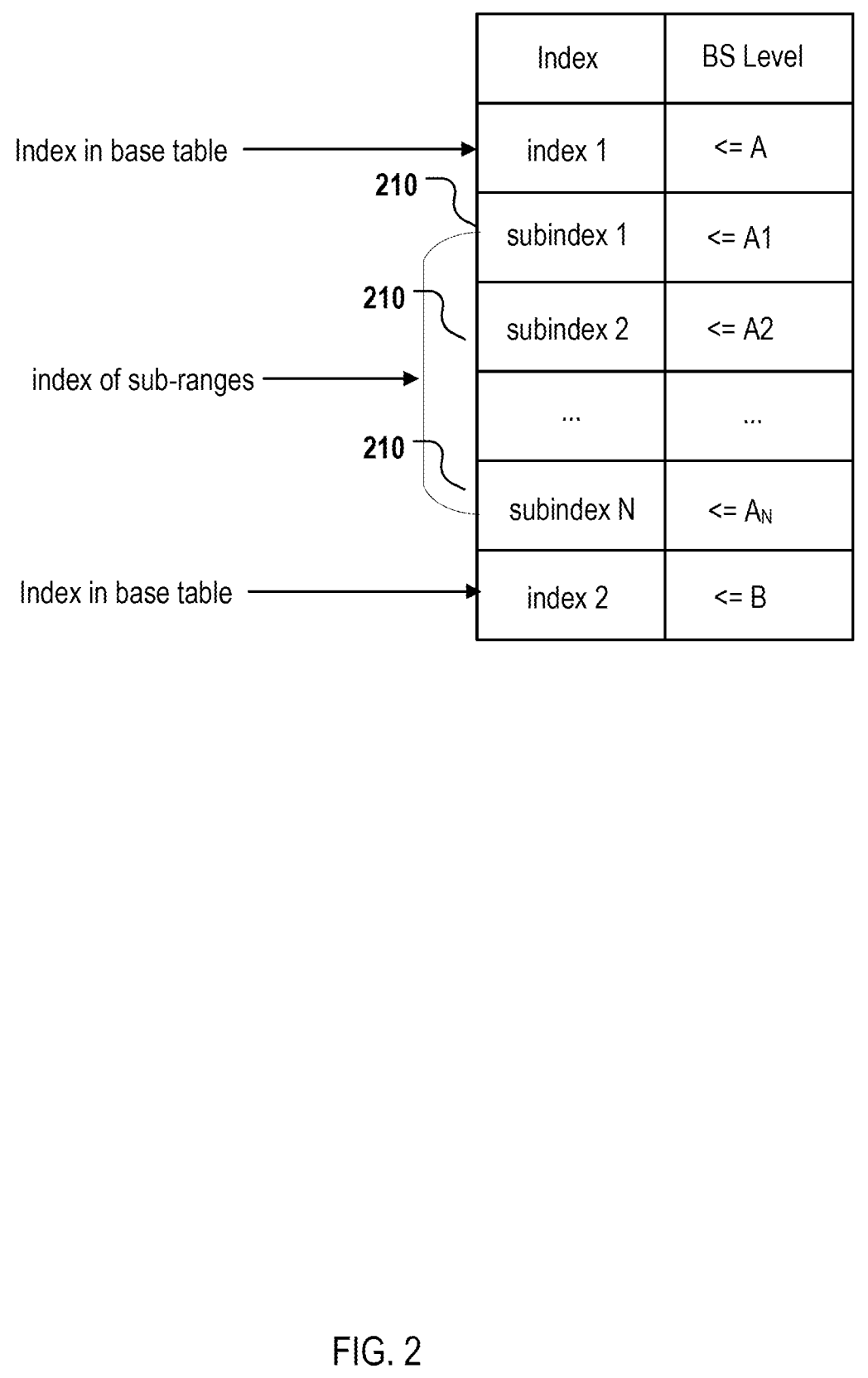

| Index | BS Level |
| --- | --- |
| index 1 | <= A |
| subindex 1 | <= A1 |
| subindex 2 | <= A2 |
| ... | ... |
| subindex N | <= $A_N$ |
| index 2 | <= B |

Index in base table

210

210 index of sub-ranges

210

Index in base table

FIG. 2

METHOD, DEVICE, AND SYSTEM FOR INDICATING A BUFFER STATUS REPORT WITH AN INDEX TO A DATA SIZE TABLE

CROSS-REFERENCE TO RELATED APPLICATION

This application is a continuation application of PCT International Patent Application No. PCT/CN2021/111146, filed with the China National Intellectual Property Administration, PRC on Aug. 6, 2021, which is herein incorporated by reference in its entirety.

TECHNICAL FIELD

This disclosure is directed generally to but is not limited to wireless communications, and particularly to methods, systems and devices for transmitting and receiving resource request indications.

BACKGROUND

With the development of wireless multimedia services, demands for high data rates and user experience are increasing, which lead to higher requirements on wireless communication system capacity and coverage. Currently, Augmented Reality (AR), eXtended Reality (XR) are some important 5G media applications under consideration and study in the industry. It is critical to make efficient use of wireless spectrum by allocating precise transmission resources for these types of applications.

SUMMARY

This disclosure is directed to methods, systems and devices for transmitting and receiving resource request indications.

In one embodiment, a method performed by a wireless terminal in a wireless network is disclosed. The method may include transmitting, to a wireless communication node in the wireless network, indication information indicating a requested data size for transmitting UL traffic to the wireless communication node, wherein the requested data size is not in a base data size table.

In one embodiment, a method performed by a wireless communication node in a wireless network is disclosed. The method may include receiving, from a wireless terminal, indication information indicating a requested data size for transmitting UL traffic to the wireless communication node, wherein the requested data size is not in a base data size table.

In some embodiments, there is a wireless communication terminal and/or a wireless communication node comprising a processor and a memory, wherein the processor is configured to read code from the memory and implement any methods recited in any of the embodiments.

In some embodiments, a computer program product comprising a computer-readable program medium code stored thereupon, the code, when executed by a processor, causing the processor to implement any method recited in any of the embodiments.

The above embodiments and other aspects and alternatives of their implementations are described in greater detail in the drawings, the descriptions, and the claims below.

BRIEF DESCRIPTION OF THE DRAWINGS

FIG. 2 shows an example for adding sub-indexes into a base buffer size table.

DETAILED DESCRIPTION

The following description and drawing set forth certain illustrative implementations of the disclosure in detail, which are indicative of several example manners in which the various principles of the disclosure may be carried out. The illustrated examples, however, are not exhaustive of the many possible embodiments of the disclosure. Other objects, advantages and novel features of the disclosure will be set forth in the following detailed description when considered in conjunction with the drawings.

INTRODUCTION

Figure 1:
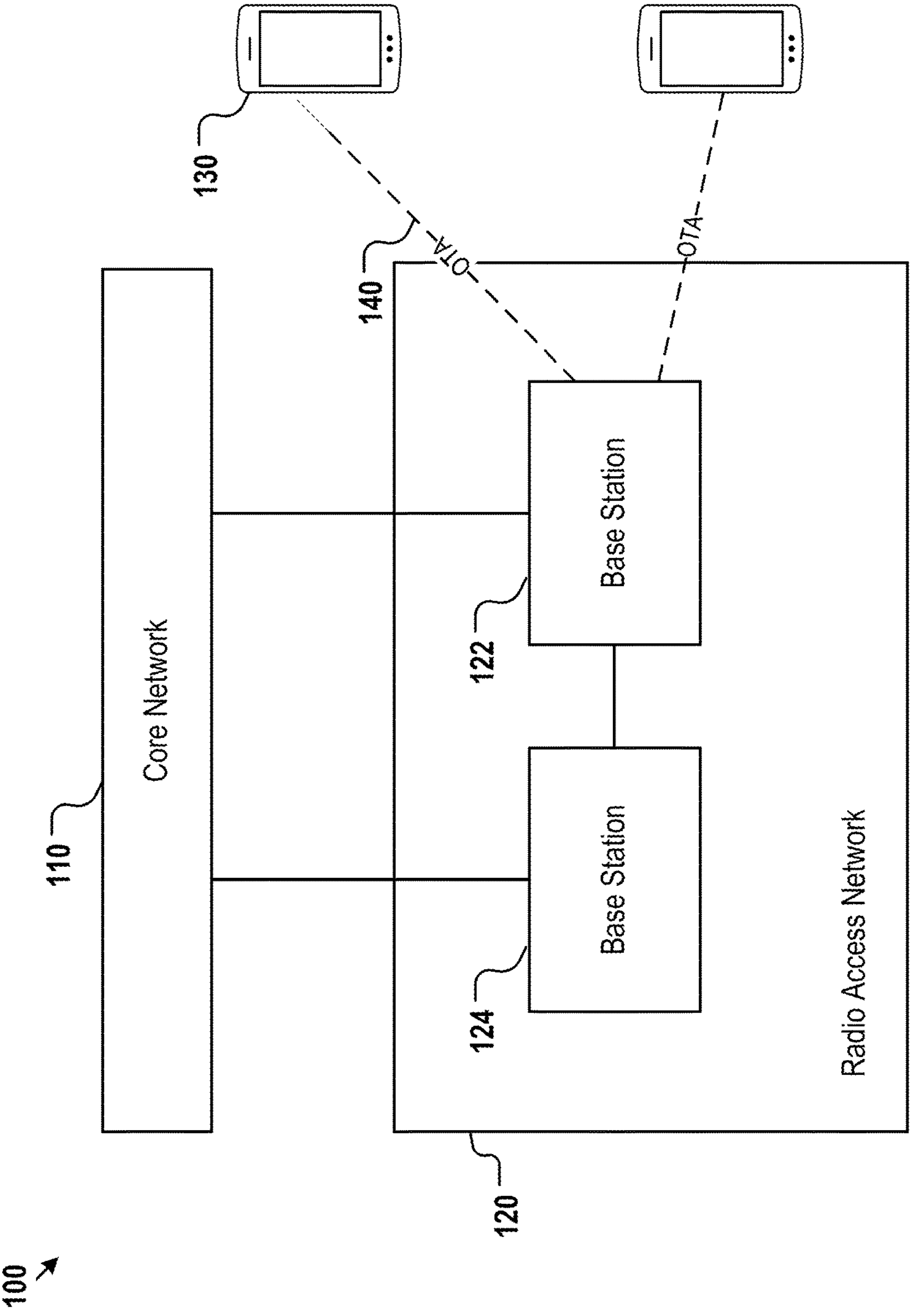
FIG. 1 shows an exemplary wireless communication network.

FIG. 1 shows an exemplary wireless communication network 100 that includes a core network 110 and a radio access network (RAN) 120. The core network 110 further includes at least one Mobility Management Entity (MME) 112 and/or at least one Access and Mobility Management Function (AMF). Other functions that may be included in the core network 110 are not shown in FIG. 1. The RAN 120 further includes multiple base stations, for example, base stations 122 and 124. The base stations may include at least one evolved NodeB (eNB) for 4G LTE, or a Next generation NodeB (gNB) for 5G New Radio (NR), or any other type of signal transmitting/receiving device such as a UMTS NodeB. The eNB 122 communicates with the MME 112 via an S1 interface. Both the eNB 122 and gNB 124 may connect to the AMF 114 via an Ng interface. Each base station manages and supports at least one cell. For example, the base station gNB 124 may be configured to manage and support cell 1, cell 2, and cell 3.

The gNB 124 may include a central unit (CU) and at least one distributed unit (DU). The CU and the DU may be co-located in a same location, or they may be split in different locations. The CU and the DU may be connected via an F1 interface. Alternatively, for an eNB which is capable of connecting to the 5G network, it may also be similarly divided into a CU and at least one DU, referred to as ng-eNB-CU and ng-eNB-DU, respectively. The ng-eNB-CU and the ng-eNB-DU may be connected via a W1 interface.

The wireless communication network 100 may include one or more tracking areas. A tracking area may include a set of cells managed by at least one base station. For example, tracking area 1 labeled as 140 includes cell 1, cell 2, and cell 3, and may further include more cells that may be managed by other base stations and not shown in FIG. 1. The wireless communication network 100 may also include at least one UE 160. The UE may select a cell among multiple cells supported by a base station to communication with the base station through Over the Air (OTA) radio communication interfaces and resources, and when the UE 160 travels in the wireless communication network 100, it may reselect a cell for communications. For example, the UE 160 may initially select cell 1 to communicate with base station 124, and it may then reselect cell 2 at certain later time point. The cell selection or reselection by the UE 160 may be based on wireless signal strength/quality in the various cells and other factors.

The wireless communication network 100 may be implemented as, for example, a 2G, 3G, 4G/LTE, or 5G cellular communication network. Correspondingly, the base stations 122 and 124 may be implemented as a 2G base station, a 3G NodeB, an LTE eNB, or a 5G NR gNB. The UE 160 may be implemented as mobile or fixed communication devices which are capable of accessing the wireless communication network 100. The UE 160 may include but is not limited to mobile phones, laptop computers, tablets, personal digital assistants, wearable devices, Internet of Things (IoT) devices, MTC/eMTC devices, distributed remote sensor devices, roadside assistant equipment, and desktop computers. The UE 160 may support sidelink communication to another UE via a PC5 interface.

While the description below focuses on cellular wireless communication systems as shown in FIG. 1, the underlying principles are applicable to other types of wireless communication systems for paging wireless devices. These other wireless systems may include but are not limited to Wi-Fi, Bluetooth, ZigBee, and WiMax networks.

Uplink Resource Request Indication

In a wireless communication network, a UE needs to transmit uplink (UL) data in various scenarios. For example, the UE may need to transmit interaction data when the UE is engaging in a cloud gaming service, or live streaming. The size of the UL data may be a variable and fast changing. The base station allocates UL transmission resource for the UE. If the base station may make a precise estimate and allocation on the UL resource, it will increase the spectrum utilization efficiency and system capacity. The indication may be based on a buffer size table. The UE may indicate to the base station about the UL transmission resource that the UE needs for a transmission based on, for example, a UL data buffer size. The UE buffer size indicates a transmission resource size that the UE requires to support its applications.

Table 1 below shows an example buffer size table.

TABLE 1

| Buffer Size Table | |
|---|---|
| Index | BS value |
| 0 | 0 |
| 1 | ≤10 |
| 2 | ≤14 |
| 3 | ≤20 |
| 4 | ≤28 |
| 5 | ≤38 |
| 6 | ≤53 |
| 7 | ≤74 |
| 8 | ≤102 |
| 9 | ≤142 |
| 10 | ≤198 |
| 11 | ≤276 |
| 12 | ≤384 |
| 13 | ≤535 |
| 14 | ≤745 |
| 15 | ≤1038 |
| 16 | ≤1446 |
| 17 | ≤2014 |
| 18 | ≤2806 |
| 19 | ≤3909 |
| 20 | ≤5446 |
| 21 | ≤7587 |
| 22 | ≤10570 |
| 23 | ≤14726 |
| 24 | ≤20516 |
| 25 | ≤28581 |
| 26 | ≤39818 |
| 27 | ≤55474 |
| 28 | ≤77284 |
| 29 | ≤107669 |

TABLE 1-continued

| Buffer Size Table | |
|---|---|
| Index | BS value |
| 30 | ≤150000 |
| 31 | >150000 |

In Table 1, the index corresponds to a Buffer Size (BS) value. In some embodiments, the BS value is the resource size the index indicates. For example, index 1 may indicate 10 resources (in predetermined unit such as byte) are requested, and index 2 may indicate 14 resources.

The index of the buffer size table may also indicate a buffer size range. For example, index 5 indicates a buffer size x such that $28<x\leq 38$. Note that "28" is derived using the previous adjacent index of index 5. If UE has a buffer size equals to 36, the UE may use an index 5 to indicate the size. In some embodiments, the UE chooses a BS value that is larger than and closest to the UE buffer size (i.e., a most fitted BS value that can support the UE buffer size).

The index of the buffer size table may also correspond to an upper bound and a lower bound. Using index 5 as an example, it has an upper bound of 38 and a lower bound of 28. Furthermore, the index may also correspond to a range length which may be derived from the upper and the lower bound. In some embodiments, the upper bound is the BS value associated with an index, and the lower bound is the BS value associated with a previous adjacent index. For example, index 5 corresponds to an upper bound 38, a lower bound 28, and a range length equals to 10 (the lower bound may be found by using the previous adjacent index).

When the UE report buffer size to the base station, assuming UE has a buffer size equals to 29 resources, then the UE needs to choose index 5 as the indication which indicates 38 resources, and the base station will allocation 38 resources correspondingly. As can be seen, there exists a difference between the real resource that the UE needs and the resource indicated to the base station and allocated to the UE. This difference may be referred to as a "resource size indication error". In the above example, the resource size indication error is 9 resources (e.g., 9 bytes). The larger the resource size indication error, the more transmission resource is wasted.

In Table 1, the range length represents a buffer size indication granularity. The less the range length is, the finer granularity the resource size may be indicated. For example, when the index is relatively small, the indication may be relative precise. However, with the increase of the index, the indication may be quite inaccurate as the range length corresponding to the index increases.

In this disclosure, various embodiments are disclosed to increase the precision of resource size request. For application scenarios where a coarse indication is sufficient, an existing base table may be referenced, this will at least save signaling overhead. Table 1 described above may be used as an exemplary base table. For applications that need more precise resource size request indication, the UE may use an enhanced method to indicate the resource size to the base station. A precise table, which is based on the base table acting as a supplement to the base table, is disclosed. A signaling method, which is capable of indicating more precise resource size as well as coarse resource size (as defined in the base table), is also disclosed in this disclosure.

In this disclosure, an index of the base table may be referred to as a base index. A buffer size range (or size range for simplicity) indicated by the base index may be referred to as a base size range, or base range.

In this disclosure, the buffer size table is merely an exemplary implementation. Same functionality may be achieved by using a set, a map, an array, a list, and the like. There is no limitation on how the buffer size (or data size, resource size, etc.) may be indicated.

In this disclosure, resource size may include data size, for example, data size in byte or bit. Resource size may also include other types of resources, such as Resource Block (RB), Physical Resource Block (PRB), Resource Element (RE), and the like.

Precise Resource Size Table

In some embodiments, a precise resource size table is configured as a supplement to the base table (e.g., Table 1). Referring to FIG. 2, a base size range A<x<=B (also noted as (A, B]) indicated by an index 2 of the base table are divided into N sub-ranges. Each sub-range may be assigned with an index 212. In FIG. 2, $A<A1<A2< \ldots <A_N<B$. The sub-range and its associated index may be inserted into the base table, to obtain a precise resource size table.

Various embodiments are described below on how the number of sub-ranges is determined.

Static Division

The number of sub-ranges N may be predetermined based on practical usage scenarios. In some embodiments, N may be the same for all the base size ranges defined in the base table. For example, all the base size ranges in Table 1 may be divided into 10 sub-ranges. The division may be done evenly within the base size range.

Dynamic Division

In the dynamic division scheme, the number of sub-ranges N may be a variable and may be determined based on various factors:

- The range length. For example, N may be positively correlated with the range length.
- A resource size indication error threshold. As described earlier, the resource size indication error is the difference between the real UE buffer size (for the to-be-transmitted data) and the resource size the UE indicates.

In some embodiments, the resource size indication error may be in the unit of resource block (RB). The resource size indication error threshold is the maximum error for the indication. Assuming the resource size indication error threshold is K RBs, the modulation order is $Q_m$, the corresponding buffer size indication error in byte may be express as:

$$E_{BS} \leq \frac{N_{RE}^{RB} * K * Q_m}{8}$$

Where $$N_{RE}^{RB}$$

denotes the number of resource elements in a resource block. Therefore, when dividing a base size range (X, Y] to N sub-ranges, the range length of each sub-range should satisfy $$\frac{Y-X}{N} \leq E_{BS}$$

Using Table 1 as the base table, an example is given below:

Assuming K=10, $Q_m$=2, then $E_{BS}$ can be expressed as:

$$E_{BS} = \frac{132*10*2}{8} = 330$$

The range length of a sub-range is derived by:

$$\frac{Y-X}{N} \leq 330$$

In the base table, for indexes from 0 to 17, the maximum length of sub-range should be $$\frac{2014-1446}{N} \leq 330$$

As a result, for indexes from 0 to 17, N=2.

For indexes from 18 to 23, the maximum length of sub-range should be:

$$\frac{14726-10570}{N} \leq 330$$

As a result, for indexes from 18 to 23, N=16.

For indexes from 24 to 31, the maximum length of sub-range should be:

$$\frac{150000-107669}{N} \leq 330$$

As a result, for indexes from 24 to 31, N=256.

As a summary, we may have the following mapping function (P denotes the number of sub-ranges) for different index ranges:

$$P = \begin{cases} 2 & 0 \leq \text{index} < 18 \\ 16 & 18 \leq \text{index} < 24 \\ 256 & 24 \leq \text{index} < 31 \end{cases}$$

In some embodiments, the number of sub-ranges may be defined based on an index range. For a certain index range, each base range indicated by the index in the index range may be divided into a particular number of sub-ranges. For example:

$$P = \begin{cases} 1 & 0 \leq \text{index} < x_1 \\ 2 & x_1 \leq \text{index} < x_2 \\ \vdots & \\ 2^N - 1 & x_{N-2} \leq \text{index} < x_{N-1} \end{cases},$$

For example, if the base index is between [x1, x2), then the base range indicated by the base index is divided into 2 sub-ranges. It is also to be understood that at most N bits are needed to indicate the number of sub-ranges using the dividing scheme above, as there are at most $2^N-1$ sub-ranges in a base range.

Using the dynamic division scheme, base ranges as defined in the base size table may be divided into different number of sub-ranges and the range length of the sub-ranges depends on the number of sub-ranges divided, as well as the range length of the base range.

A precise table may be configured with all the sub-ranged derived in the dynamic division scheme, with each sub-range associated with an index.

Indication of Precise Resource Size

In this disclosure, various embodiments are disclosed for indicating a precise resource size.

Indication of Precise Resource Size Using Precise Table

As described above, a precise resource size table may be configured by expanding the base table. Each index of the precise resource size table indicates a more precise resource size range.

In this disclosure, various embodiments are disclosed to for the UE to indicate the index of the precise table to the base station.

In some embodiments, a type 1 indication is used. The UE may send the indication information to the base station via a single message, such as a Buffer Status Report (BSR). The indication is via uplink transmission.

In some embodiments, a type 2 indication is used. The UE may send the indication information via two messages, such as two BSR messages. The index of the precise table is indicated jointly by these two BSRs.

In particular, the first BSR includes at least one of following information:

- an enable flag for a second BSR;
- an index in the base table; or
- time and frequency domain resource information of a second BSR.

The base station may use the enable flag to determine if there is a second BSR that needs to be received and processed. If the enable flag indicates there is a second BSR, the base station will receive the second BSR based on the time and frequency domain resource information. The base station may then use the joint information in the first and the second BSR to determine the index to the precise table.

This enable flag may also serve as a fallback indicator. For example, if the enable flag indicates there is no second BSR, then the base station will only use the index of the base table carried in the first BSR and use the base table to perform buffer size lookup.

In some embodiments, the two BSRs may be transmitted together.

In some embodiments, the two BSRs may be transmitted separately.

The selection of type 1 or type 2 indication may be pre-determined, or the selection may be signaled dynamically. More details on the determination of type 1 and type 2 indication will be described in later sections, Indication of Precise Resource Size Using Base Table and Sub-Range Information In some embodiments, rather than configuring or creating a precise table, the precise resource size may be indicated by giving a base index to the base table, as well as information of the particular sub-range within the base size range indicated by the base index.

Figure 3:
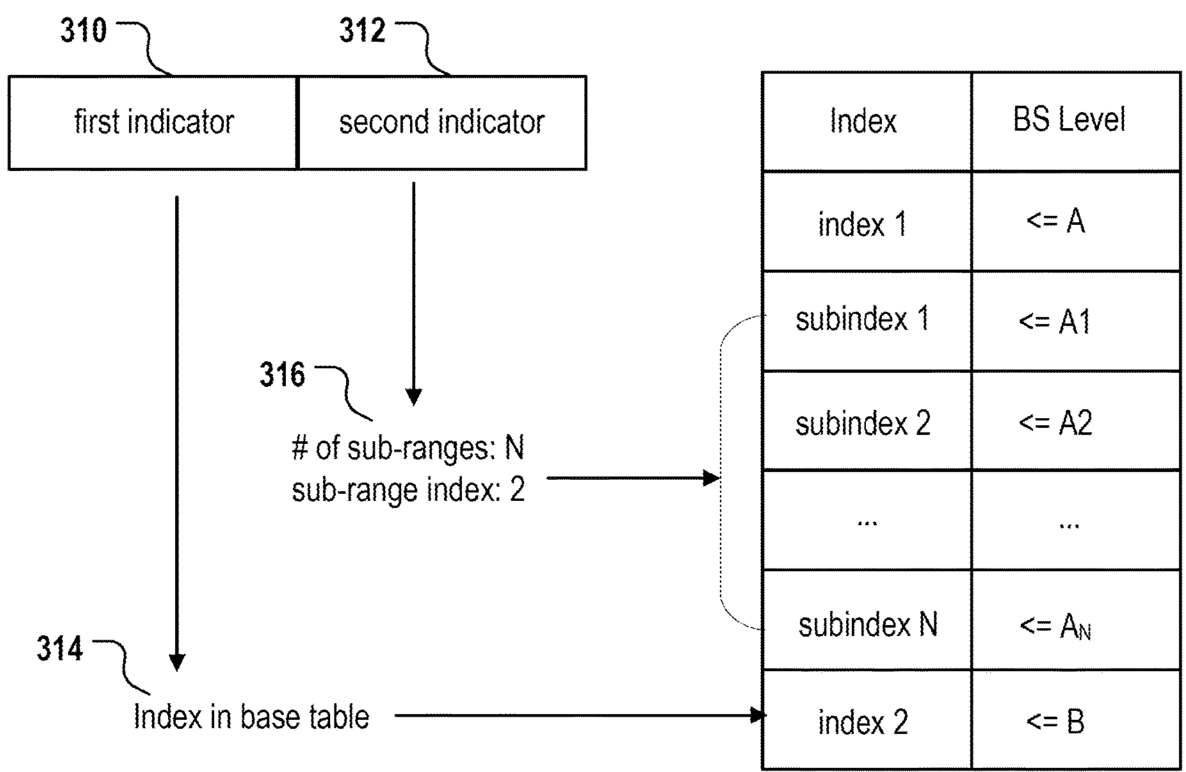
FIG. 3 shows an exemplary method to indicate a precise transmission resource size using a first indicator and a second indicator, based on a base buffer size table.

The indication information may be divided into two segments as two indicators. Referring to FIG. 3, the indication may be done using two indicators: a first indicator 310 and a second indicator 312. The first indicator indicates the index to the base table 314, and the second indicator indicate the sub-range information 316, which includes the number of sub-ranges, and the sub-range index.

The type 1 indication and type 2 indication as described earlier may also be used in these embodiments.

In type 1 indication, the indication information carried in the single BSR contains (M+N) bits. The M bits correspond to the first indicator and indicate the index to the base table, and the N bits correspond to the second indicator and indicate the number of sub-ranges as well as the sub-range index.

In type 2 indication, the indication information is transmitted in two BSRs. The first BSR correspond to the first indicator and may indicate the index to the base table, and the second BSR correspond to the second indicator and may indicate the number of sub-ranges as well as the sub-range index.

In some embodiments, the second indicator does not indicate the number of sub-ranges which may be pre-determined.

In some embodiments, the second indicator may further indicate a traffic type of the uplink traffic. The traffic type information may be used by the base station to predict or estimate coming downlink or uplink traffic based on the traffic type.

The base station may determine a precise resource size according to the indication information, by using the formula below:

$$\min\left(X + \text{ceil}\left(L \times \frac{Y - X}{N}\right), Y\right)$$

X is the lower bound according to the index to the base table, Y is the upper bound according to the index to the base table, N is the number of sub-ranges, and L is the sub-range index.

As an example, assuming the index to the base table is 18, the sub-range index indicated by BSR is 6, and the number of sub-ranges in the base range indicated by index 18 is 16. Then, the BS level can be expressed as:

$$\min\left(2014 + \text{ceil}\left(6 \times \frac{2806 - 2014}{16}\right), 2806\right) = 2311$$

Therefore, a BS level in in the range (2262, 2311] can be indicated as 2311 instead of 2806, thus improving the indication precision.

In the equation above, in addition to using the "min" (take the minimum) operation, a "max" operation to take the maximum may also be used. In addition to using the "ceil" (ceiling) operation, a floor operation, or a round to the nearest integer operation may also be used.

Determination of Type 1 and Type 2 Indication

The selection of type 1 or type 2 indication may be pre-determined. The base station and the UE may also negotiate the type of indication for indicating resource size requested. For example, the determination be based on higher layer parameter, which includes at least one of:

- Logical channel ID (LCID) in Subheader of Media Access Control (MAC) Protocol Data Units (PDUs);
- Enhanced LCID (eLCID) in MAC PDUs;
- MAC Control Element (MAC CE); or
- Radio Resource Control (RRC) signaling.

For example, a reserved LCID, or a reserved LCID codepoint/index may be used to indicate type 1 or type 2 indication. Alternatively, an LCID, or a reserved LCID codepoint/index may be re-used or share to indicate the type 1 or type 2 indication.

The determination may also be based on UE capability.

Traffic Awareness Information Report

A UE may support multiple applications simultaneously. For example, an AR application, and a social media application. Each application may be associated with uplink (UL) traffic with different priority. The priority may be indexed from 1 to 8 with 1 represents the lowest priority and 8 the highest. It is beneficial for the base station to get notified, or be aware of UE's UL traffic characteristics or traffic requirement. The UE may report this type of information to the base station. For example, UE may report, for uplink traffic of each application, or selected application, an associated priority. For example, UL traffic 1 has priority 2, and UL traffic 2 has priority 8. With this type of traffic awareness information, the base station may allocate UL resources more efficiently and more accurately.

As another example, a UE may have two different types of downlink (DL) traffic stream: Field of View (FoV) stream, and non FoV stream. The FoV stream may be associated with a background image/video rendered in an AR application, which does not require the same resolution as a focus view. When the UE orientation change, the base station may transmit a new FoV associated with the new orientation. It is beneficial for the UE to report the UE orientation change to the base station, so the base station may adjust the DL traffic resource for transmitting the new FoV.

The type 1 and type 2 indication as described earlier in this disclosure may be used to report the traffic awareness information. For example, a type 1 indication may be used, in which one BSR is used to transmit the traffic awareness information. For another example, a type 2 indication may be used, in which two BSRs are used to transmit the traffic awareness information. These two BSRs may be jointly coded, or be transmitted separately.

The traffic awareness information may include:

UL traffic priority;

UL traffic type;

Remaining delay budget of UL traffic; and

UE behavior information.

The description and examples in this disclosure are made from the network (e.g., base station) perspective, or from the UE perspective. It is to be understood that the network and the UE operate in a coordinated manner. The principle applies to the network side also applies to the UE side. For example, when the network transmits the WUB to the UE, the underlying principle for the transmission also applies to the reception of the WUB on the UE side.

The description and accompanying drawings above provide specific example embodiments and implementations. The described subject matter may, however, be embodied in a variety of different forms and, therefore, covered or claimed subject matter is intended to be construed as not being limited to any example embodiments set forth herein. A reasonably broad scope for claimed or covered subject matter is intended. Among other things, for example, subject matter may be embodied as methods, devices, components, systems, or non-transitory computer-readable media for storing computer codes. Accordingly, embodiments may, for example, take the form of hardware, software, firmware, storage media or any combination thereof. For example, the method embodiments described above may be implemented by components, devices, or systems including memory and processors by executing computer codes stored in the memory.

Throughout the specification and claims, terms may have nuanced meanings suggested or implied in context beyond an explicitly stated meaning. Likewise, the phrase "in one embodiment/implementation" as used herein does not necessarily refer to the same embodiment and the phrase "in another embodiment/implementation" as used herein does not necessarily refer to a different embodiment. It is intended, for example, that claimed subject matter includes combinations of example embodiments in whole or in part.

In general, terminology may be understood at least in part from usage in context. For example, terms, such as "and", "or", or "and/or," as used herein may include a variety of meanings that may depend at least in part on the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," may be understood to convey a singular usage or to convey a plural usage, depending at least in part upon context. In addition, the term "based on" may be understood as not necessarily intended to convey an exclusive set of factors and may, instead, allow for the existence of additional factors not necessarily expressly described, again, depending at least in part on context.

Reference throughout this specification to features, advantages, or similar language does not imply that all of the features and advantages that may be realized with the present solution should be or are included in any single implementation thereof. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One of ordinary skill in the relevant art will recognize, in light of the description herein, that the present solution may be practiced without one or more of the specific features or advantages of a particular embodiment. In other instances, additional features and advantages may be recognized in certain embodiments that may not be present in all embodiments of the present solution.

What is claimed is:

1. A method performed by a wireless terminal in a wireless network, comprising:

transmitting, to a wireless communication node in the wireless network, indication information indicating an index pointing to an entry value in a precise data size table, the entry value indicating a requested data size for transmitting UL traffic to the wireless communication node, wherein:

the precise data size table is associated with or supplemental to a base data size table;

the base data size table comprises M data size ranges, each of the M data size ranges associated with two adjacent indexes of the base data size table, and characterized by a lower bound X, an upper bound Y, and a range length defined by X and Y, X and Y being non-negative numbers; and the precise data size table is characterized by:

each of M1 data size ranges within the M data size ranges comprising N continuous sub-ranges, each of the N sub-ranges corresponding to a precise data size and being associated with an index, wherein the precise data size is greater than or equal to X and is less than or equal to Y, N and M1 being a positive integer; and the precise data size table being based on the precise data size of each of the N sub-ranges within the each of the M1 data size ranges and the associated index.

2. The method of claim 1, wherein the indication information comprises a buffer status report (BSR).

3. The method of claim 1, wherein N is a variable for the each of the M1 data size ranges and is associated with:

the range length of the each of the M data size ranges; and a data size indication error threshold.

4. The method of claim 1, wherein the indication information is indicative of a data size range from the M data size ranges, and the requested data size is within the data size range.

5. The method of claim 4, wherein the indication information is indicative of a subrange index L of a subrange in the data size range, and the requested data size is associated with the subrange index, L being a non-negative integer.

6. The method of claim 5, wherein the requested data size is determined by the lower bound of the data size range, the upper bound of the data size range, a sub-range index L associated with a sub-range in the data size range, and a number of sub-ranges N in the data size range, N being a positive integer.

7. The method of claim 1, wherein the indication information further indicates a remaining delay budget of the UL traffic.

8. A computer program product comprising a non-transitory computer-readable program medium with computer code stored thereupon, the computer code, when executed by one or more processors, causing the one or more processors to implement a method of claim 1.

9. A method performed by a wireless communication node in a wireless network, comprising:

receiving, from a wireless terminal, indication information indicating an index pointing to an entry value in a precise data size table, the entry value indicating a requested data size for transmitting UL traffic to the wireless communication node, wherein:

the precise data size table is associated with or supplemental to a base data size table;

the base data size table comprises M data size ranges, each of the M data size ranges associated with two adjacent indexes of the base data size table, and characterized by a lower bound X, an upper bound Y, and a range length defined by X and Y, X and Y being non-negative numbers; and the precise data size table is characterized by:

each of M1 data size ranges within the M data size ranges comprising N continuous sub-ranges, each of the N sub-ranges corresponding to a precise data size and being associated with an index, wherein the precise data size is greater than or equal to X and is less than or equal to Y, N and M1 being a positive integer; and the precise data size table being based on the precise data size of each of the N sub-ranges within the each of the M1 data size ranges and the associated index.

10. The method of claim 9, wherein the indication information comprises a buffer status report (BSR).

11. The method of claim 9, wherein N is a variable for the each of the M1 data size ranges and is associated with:

the range length of the each of the M data size ranges; and a data size indication error threshold.

12. The method of claim 9, wherein the indication information is indicative of a data size range from the M data size ranges, and the requested data size is within the data size range.

13. A device for wireless communication comprising a memory for storing computer instructions and a processor in communication with the memory, wherein, when the processor executes the computer instructions, the processor is configured to implement a method of claim 9.

14. A computer program product comprising a non-transitory computer-readable program medium with computer code stored thereupon, the computer code, when executed by one or more processors, causing the one or more processors to implement a method of claim 9.

15. A wireless device comprising: a memory for storing computer instructions and a processor in communication with the memory, wherein, when the processor executes the computer instructions, the processor is configured to cause the wireless device to:

transmit, to a wireless communication node, indication information indicating an index pointing to an entry value in a precise data size table, the entry value indicating a requested data size for transmitting UL traffic to the wireless communication node, wherein:

the precise data size table is associated with or supplemental to a base data size table;

the base data size table comprises M data size ranges, each of the M data size ranges associated with two adjacent indexes of the base data size table, and characterized by a lower bound X, an upper bound Y, and a range length defined by X and Y, X and Y being non-negative numbers; and the precise data size table is characterized by:

each of M1 data size ranges within the M data size ranges comprising N continuous sub-ranges, each of the N sub-ranges corresponding to a precise data size and being associated with an index, wherein the precise data size is greater than or equal to X and is less than or equal to Y, N and M1 being a positive integer; and the precise data size table being based on the precise data size of each of the N sub-ranges within the each of the M1 data size ranges and the associated index.

* * * * *